(12) United States Patent
Kamel et al.

(10) Patent No.: US 8,396,857 B2
(45) Date of Patent: Mar. 12, 2013

(54) SYSTEM TO MODIFY WEBSITES FOR ORGANIC SEARCH OPTIMIZATION

(75) Inventors: Alexandre Perry Kamel, Castle Rock, CO (US); Stephen Denis Kirkby, Unley Park (AU); Peter Kellett, Kilburn (AU); Hikaru Phillips, Tamarama (AU); Amelia Jones, North Adelaide (AU); Kurt Vander Bogart, Eugene, OR (US); Judy A. Koonce, Sachse, TX (US)

(73) Assignee: Accenture Global Services Limited, Dublin (IE)

( * ) Notice: Subject to any disclaimer, the term of this patent is extended or adjusted under 35 U.S.C. 154(b) by 0 days.

(21) Appl. No.: 12/853,979

(22) Filed: Aug. 10, 2010

(65) Prior Publication Data
US 2011/0055217 A1 Mar. 3, 2011

Related U.S. Application Data

(60) Provisional application No. 61/238,388, filed on Aug. 31, 2009.

(51) Int. Cl.
*G06F 17/30* (2006.01)

(52) U.S. Cl. ........ 707/711; 707/706; 707/707; 707/708; 707/709; 707/712; 707/713; 707/736; 707/758; 707/781

(58) Field of Classification Search ........... 707/706, 707/707, 708, 709, 711, 712, 713, 736, 758, 707/781, 999.002, 999.003, 999.004, 999.005, 707/999.006
See application file for complete search history.

(56) References Cited

U.S. PATENT DOCUMENTS

| 7,428,705 | B2 | 9/2008 | Ronald et al. |
| 7,636,732 | B1* | 12/2009 | Nielsen ................... 1/1 |
| 2005/0060168 | A1 | 3/2005 | Murashige et al. |
| 2006/0085401 | A1 | 4/2006 | Anderson et al. |
| 2006/0106866 | A1* | 5/2006 | Green et al. ............... 707/104.1 |
| 2007/0168465 | A1* | 7/2007 | Toppenberg et al. ......... 709/218 |
| 2008/0071766 | A1 | 3/2008 | Grieselhuber et al. |
| 2008/0222130 | A1* | 9/2008 | Patel et al. ........................ 707/5 |

(Continued)

FOREIGN PATENT DOCUMENTS

| JP | 2004-029884 A | 1/2004 |
| JP | 2007-011664 A | 1/2007 |

(Continued)

OTHER PUBLICATIONS

European Patent Office, Search Report on European Patent Application No. 10008489.6, Dec. 27, 2010.

(Continued)

*Primary Examiner* — Syling Yen
(74) *Attorney, Agent, or Firm* — Mannava & Kang, P.C.

(57) ABSTRACT

A system is configured to modify a website to optimize the website for an organic search of a topic. The system includes a data management module configured to receive search terms for the topic, receive related terms to the search terms for the topic, and receive website input data. The system also includes a scanning module configured to scan and index web pages and web objects in the website and identify a subset of web pages and web objects associated with the search terms and the related terms. The system also includes an optimizing module configured to process the subset of web pages and web objects from the website by prioritizing the subset of web pages and web objects or measuring a metric with respect to the subset of web pages and web objects. The search terms and related terms are deployed into the subset of web pages and web objects on the website based on the processing.

17 Claims, 6 Drawing Sheets

U.S. PATENT DOCUMENTS

2009/0094137 A1   4/2009  Toppenberg et al.
2009/0210409 A1   8/2009  Levin
2010/0332515 A1*  12/2010 Carraher et al. ............. 707/769

FOREIGN PATENT DOCUMENTS

WO        2007/076455 A2   7/2007

OTHER PUBLICATIONS

English translation of "Korean search report on Korean Application No. 10-2010-0078544", Korean Patent Office, Nov. 21, 2012, 2 pages.

* cited by examiner

SCREENSHOT FOR SEARCH ACCURACY RESULTS BY CATEGORY REPORT
210

⚠ THIS SITE CONTAINS PRESENCE OF RELEVANT PAGES WITHOUT AT LEAST 1 DESIGNATED SEARCH TERM 54.2% WHICH IS GREATER THAN THE RED THRESHOLD LIMIT 20.0%

CATEGORY 1 WITH NO SEARCH TERMS

THIS CATEGORY CONTAINS BATTERIES AS RELEVANT TERMS AND POWER, INDUSTRIAL, UPS, MARINE, VEHICLE, HOUSEHOLD, MOTORCYCLE, PHONE, TOYS, WIRELESS, RECHARGEABLE AS SEARCH TERMS 1. demosite/links.html (LINKS)
    RELEVANT TERMS: BATTERIES
2. demosite/company/position2.html (GRADUATE)
    RELEVANT TERMS: BATTERIES
3. demosite/products/product2.html (EmcA SUPERLIGHT)
    RELEVANT TERMS: BATTERIES
4. demosite/products/product15.html (EmcA LIGHTER LIGHT)
    RELEVANT TERMS: BATTERIES
5. demosite/products/product16.html (EmcA LONGER LIGHT)
    RELEVANT TERMS: BATTERIES
6. demosite/products/product14.html (EmcA TIME MACHINE)
    RELEVANT TERMS: BATTERIES

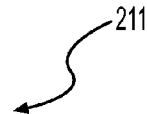

CATEGORY 1 WITH SEARCH TERMS:

THIS CATEGORY CONTAINS BATTERIES AS RELEVANT TERMS AND POWER, INDUSTRIAL, UPS, MARINE, VEHICLE, HOUSEHOLD, MOTORCYCLE, PHONE, TOYS, WIRELESS, RECHARGEABLE AS SEARCH TERMS 1. demosite/(MAIN INDEX)
    RELEVANT TERMS: BATTERIES
    SEARCH TERMS: POWER, INDUSTRIAL, MARINE, HOUSEHOLD, MOTORCYCLE, PHONE, TOYS, RECHARGEABLE
2. demosite/company/index.html (COMPANY INDEX)
    RELEVANT TERMS: BATTERIES
    SEARCH TERMS: POWER, INDUSTRIAL, MARINE, HOUSEHOLD, MOTORCYCLE, PHONE, TOYS, RECHARGEABLE
3. demosite/consulting/index.html (INDEX)
    RELEVANT TERMS: BATTERIES
    SEARCH TERMS: POWER, INDUSTRIAL, MARINE, HOUSEHOLD, MOTORCYCLE, PHONE, TOYS

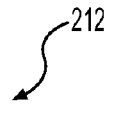

*FIG. 2B*

SYSTEM TO MODIFY WEBSITES FOR ORGANIC SEARCH OPTIMIZATION

PRIORITY

This application claims priority to U.S. Provisional Patent Application Ser. No. 61/238,388, filed Aug. 31, 2009, entitled "Precise Organic Deployment for Search Engine Optimization", by Kamel et al., which is incorporated by reference in its entirety.

BACKGROUND

Search-driven consumer traffic is an important source of potential online sales. For example, search engines, such as GOOGLE, YAHOO, BING, BAIDU (Chinese search engine) and others, are often used to seek information regarding products, services, or topics of interest. Users may be driven to certain websites based on their rankings in organic search results. Organic search results are listings of search engine results that appear because of their relevance to the search terms rather than being advertisements which may be displayed based on other criteria. Typically, advertisements are displayed on the side of the displayed organic search results as shown on a web page.

For example, a company interested in promoting the sale of high-definition flat-panel televisions via the Internet would aim to ensure that its website or uniform resource locator (URL) was prominently featured by leading search engines among relevant destinations in response to consumer search inquiries surrounding related search terms. Examples of the search terms for the topic of high-definition flat-panel televisions via the Internet may include such search terms as flat-panels, high definition televisions (HDTVs), plasma, liquid crystal display (LCD). The company would hope that if any of these search terms were used, the company's URL would have a high ranking in the search results and thus the company's URL would be displayed higher on the search results list returned by the search engine.

To achieve a high ranking in search results, companies select the relevant search terms that they believe consumers would use to execute online searches for a particular product, service, or informational category. Having selected such search terms, the companies then endeavor to ensure that those relevant terms are effectively deployed throughout the websites in both page content (including page titles, sub-titles or H1/H2 tags, and page body content), associated meta-data (or descriptions about the content, including meta-descriptions, meta-keywords), and other page attributes including in-link text, URL text, and associated document properties.

By deploying selected terms accordingly in a website, search engines are more likely to effectively interpret the nature of the content when crawling and indexing the website for purposes of search engine categorization of the content. In simple terms, when a search engine indexes the site content, it is more likely to recognize the consistent presence of the search terms, and thereby associate the corresponding content and related website or URL(s) with the search terms. As a result, the odds that the corresponding URL(s) would be rendered in response to a search with those search terms are increased. This elevates the website or URL(s) within the search rankings, or a list of rendered URL(s) associated with such searches, and therefore can contribute to an increase in consumer traffic associated with those categories.

Although, search engine optimization has emerged as an important practice, it is still inaccurate and lacks precision, especially with large and dynamic websites. It is often ineffective in improving search engine rankings and search-driven traffic volumes, with respect to relevant products, services, or informational categories. This is because the practice of optimizing organic search productivity, although fairly simple in theory, is complicated to effectively execute. Once relevant search terms have been selected, it can be difficult to identify the corresponding relevant pages and the key locations on pages within a given website to maximize the density of the search terms, particularly if the website in question is large (i.e., containing many pages, documents, and other objects) and dynamic (i.e., frequent changes in website content over time). The task of identifying and optimizing those pages and page locations throughout a large and dynamic website which are relevant to the topic or category in question can pose significant challenges. Deployment of selected search terms on pages and page locations that are not relevant or germane to the topic or category in question would serve no useful purpose, and could in fact cause confusion in the marketplace.

BRIEF SUMMARY OF THE INVENTION

According to an embodiment, a system is configured to modify a website to optimize the website for an organic search of a topic. The system includes a data management module configured to receive search terms for the topic, receive related terms to the search terms for the topic, and receive website input data, wherein the website input data includes web pages and web objects from the website. The system also includes a scanning module configured to scan and index the web pages and web objects in the website and identify a subset of web pages and web objects associated with the search terms and the related terms. The system also includes an optimizing module operated by a computer system configured to process the subset of web pages and web objects from the website by prioritizing the subset of web pages and web objects or measuring a metric with respect to the subset of web pages and web objects, and deploy the search terms and related terms into the subset of web pages and web objects on the website based on the processing.

According to another embodiment, the a system includes a data storage device configured to store search terms for the topic, related terms to the search terms for the topic, and website input data including web pages and web objects from the website. The system also includes a processor configured to scan and index the web pages and web objects in the website, identify a subset of web pages and web objects associated with the search terms and related terms, process the subset of web pages and web objects from the website by prioritizing the subset of web pages and web objects or measuring a metric with respect to the subset of web pages and web objects, and deploy the search terms and the related terms into the subset of web pages and web objects on the website based on the processing.

According to another embodiment, a method for modifying a website to optimize the website for an organic search of a topic includes receiving search terms for the topic, receiving related terms to the search terms for the topic, and receiving website input data, wherein the website input data includes web pages and web objects from the website. The method also includes scanning and indexing the web pages and web objects in the website, and identifying a subset of web pages and web objects associated with the search terms and the related terms. The method also includes processing the subset of web pages and web objects from the website by prioritizing the subset of web pages and web objects or measuring a metric with respect to the subset of web pages and web objects, and deploying the search terms and related terms into the subset of web pages and web objects on the website based on the processing. The method may be performed by a computer system executing computer readable instructions provided on a non-transitory computer readable medium.

BRIEF DESCRIPTION OF DRAWINGS

Embodiments are described in detail in the following description with reference to the following figures.

FIGS. 2A-2C illustrate screenshots for an OSO system, according to different embodiments;

DETAILED DESCRIPTION OF EMBODIMENTS

Figure 1:
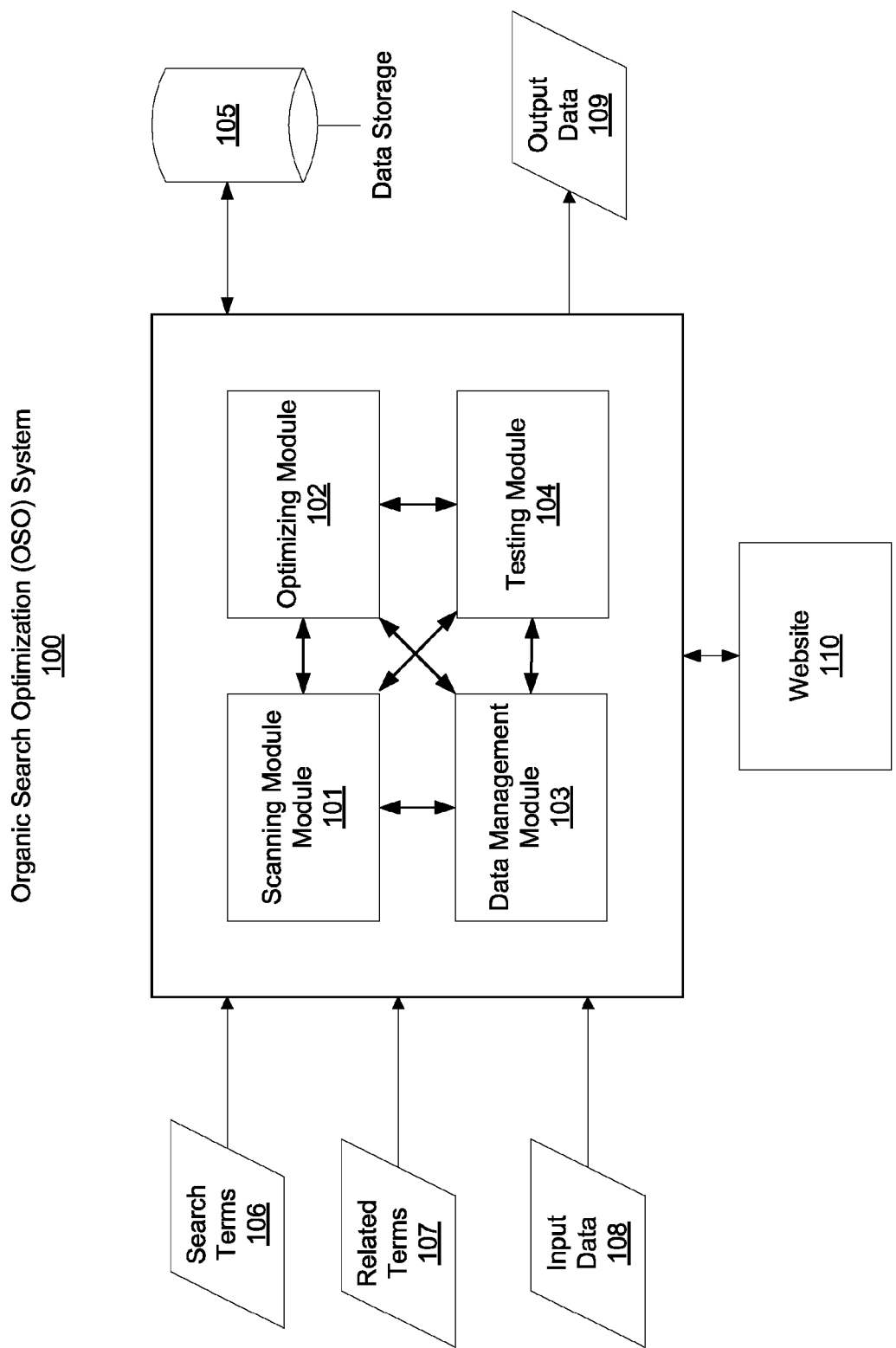
FIG. 1 illustrates an organic search optimization (OSO) system, according to an embodiment.

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. Overview

According to embodiments, systems and methods are disclosed to modify websites, including large and/or dynamic websites, for search engine optimization. Utilizing the input of search terms and related terms for a website, the system identifies the corresponding relevant pages and, optionally, the key locations on pages within a given website to maximize the density of these terms on select pages and page locations in the website. This is particularly effective if the website is large (i.e., containing many pages, documents, and other objects) and/or dynamic (i.e., frequent changes in website content over time). A large website may include hundreds or even thousands of pages and in a dynamic website, it is common for portions of the content on key pages in the dynamic website to be updated monthly or weekly, if not more often, such as daily, hourly, or by the minute. It should be noted that the systems and methods can optimize websites of any size, whether large or small, and can optimize websites that are dynamic or static. The optimizing includes identifying pages and page locations throughout a website which are relevant to the topic or category in question, and deploying of selected search terms and related terms on those pages and page locations that are relevant or germane to the topic or category in question. This improves the ranking results of the website for an organic search.

2. System

According to an embodiment, an organic search optimization (OSO) system is configured to optimize a website to improve the website's rank in organic search results for a topic. The OSO system enhances the organic search result ranking of a website having web pages and web objects that are dynamic in nature, which may include periodic changes to the web pages. A topic may be a category, a subject, an issue, a product, etc. A web page is a document or resource that can be accessed through the Internet, and a website may be comprised of a group of web pages. A web object may be a document or other unit of information on a website. Examples of web objects include but are not limited to plain text, hypertext, images, audio, video and other multimedia objects, and executable applications. A web object may be a binary file or a database entry residing on a machine hosting the website, or it may be dynamically generated by the website as needed.

FIG. 1 illustrates an OSO system 100, according to an embodiment. The OSO system 100 includes a data storage 105, a scanning module 101, an optimizing module 102, a data management module 103, and a testing module 104. These modules in the OSO system 100 may be separate modules or one or more of the modules may be combined in the OSO system 100. A module is software, computer hardware, or a combination of hardware and software. The data storage 105 may include a database or other types of data storage systems and may include one or more data storage devices.

As described above, the OSO system 100 optimizes a website for organic searches. The OSO system 100 determines search terms, which may be related to a particular topic. The search terms may be provided to the OSO system 100 by a user or another system. The search terms are shown in FIG. 1 as search terms 106. The search terms 106 are selected for modifying the website to improve the organic search productivity of the website as it relates to the topic for the search terms. Organic search productivity may include the effectiveness with which web traffic is driven to the website. Organic search productivity may be driven by many factors including: the proper selection of search terms reflecting the search behavior of consumers for a particular topic; the density (or frequency and proximity) of search term deployment on relevant web pages; and the consistent alignment of the search terms across a variety of page attributes for those relevant pages, including page title, meta-descriptions, meta-keywords, H1 Tags, URL, in-link text and document properties.

In addition to the search terms 106 for the topic, one or more related terms 107 also relevant to the topic may be determined. For example, assume the topic is high-definition flat-panel televisions. The related terms 107 may not specifically describe the topic of high-definition flat-panel televisions, but would nevertheless be considered useful in attracting traffic having an interest in that topic to the website. Related terms 107 in this example may include electronics, home entertainment, movies, video systems, and the like. The search terms 106 and related terms 107 for the topic are received at the data management module 103. The search terms 106 and the related terms 107 may also be stored in the data storage 105.

The scanning module 101 scans a website, such as the website 110, to determine input data 108. The input data 108 may include web pages, web objects and the associated metadata. The metadata may also describe the website structure. This may include a hierarchy of web pages that are in the website 110. For example, the home page may be a root and then other web pages extend from forming branches depending on their relationships with each other and/or the root. The metadata may also describe website activity, such as types of interactive user behavior with the web pages. The input data 108 describing the web objects and web pages may include attributes of the web objects and web pages, such as title, filename, picture resolutions, etc. The input data 108 may be determined from other sources outside the scanning of the website 110 performed by the scanning module 101. The input data 108 may be stored in the data storage 105 by the data management module 103.

The scanning performed by the scanning module 101 may include scanning all the pages and content on a website and then indexing the scanned web pages and web objects of the website 110 using the input data 108. The scanning module 101 collects from the website 110 metadata available in the web pages that describes the web pages and web objects. Web crawlers may be used to gather the metadata and other data available from XML or HTML in the web pages. The scanning module 101 then identifies a subset of the scanned web pages and web objects from website 110 which are associated to some predetermined degree or measure with the search terms 106 and the related terms 107. This is achieved, for example, through a contextual analysis or comparative analysis of indexed content versus the selected search terms and the related terms. This scanning may also identify the locations on the web pages and web objects where the selected terms may be found. The scanning module 101 then indexes all the content on a subject website, including all the text on each page including body content and meta-data attributes.

The OSO system 100 allows for input of the selected search terms and any related terms of interest that help identify pages associated with those terms. The OSO system 100 then searches the scanned pages to identify any and all instances which contain one or more of the specified terms. This scanning may also identify the locations on the web pages and web objects where the selected terms may be found. For example, the scanning module 101 determines whether any of the search terms 106 or the related terms 107 are in a web object or web page and, if so, tags the web object or web page for inclusion in the subset. The tag may be a flag stored with the input data for the web object or web page that can be identified by the modules of the OSO system 100.

After the scanning module 101 identifies the subset of web pages and web objects associated with the search terms 106 and the related terms 107, the optimizing module 102 processes the subset of web pages and web objects according to one or more metrics to identify gaps in the deployment of the search terms 106 and related terms 107 in the subset of web pages and web objects in the website 110. A gap is an instance in which one or more of the search terms 106 or related terms 107 are missing from a web page, web object, or a location on a web page or web object. A determination that a web object or web page is missing a search term or related term, i.e., a gap, is determined based on the metrics.

The metrics for determining gaps and optimizing web pages may include accuracy, alignment and integrity. The optimizing module 102 may measure these metrics. In measuring the accuracy metric, the optimizing module 102 scans the subset of web pages and web objects identified to determine whether at least one search term or related term is present in each of the web pages and web objects from the website 110 in the subset identified by the scanning module 101.

The accuracy metric determines whether each of the web pages or web objects has at least one selected search term or related term appearing anywhere on the web page or in the web object, although different search terms or related terms can appear on different web pages or web objects in the subset to satisfy the metric. For example, for the topic of high-definition flat-panel televisions, the optimizing module 102 determines whether any of the terms include flat-panel or high definition television are on the subset of web pages. Given a specified set of search terms or related terms for a particular topic set or product category, this metric verifies that at least one such search term or related term is present on each of the relevant subset of web pages.

The search terms 106 and related terms 107 may be determined by systems, experts, or provided by another source. The relevant subset of web pages is determined through website indexing to identify the subset of web pages which reflect content appropriate to the relevant category, topic, product set, etc. Having identified the relevant subset of web pages, the report confirms the presence of search terms or related terms on the web pages, and identifies those relevant web pages missing the corresponding search terms or related terms.

Web indexing may include measuring performance drivers. Examples of the drivers include use of search terms or related terms (i.e., whether terms on each web page); density of search terms or related terms, and proper alignment among designated page attributes reflected by consistent deployment of such designated search terms or related terms.

The alignment metric measures a consistent application of the search terms 106 and related terms 107 across attributes for the subset of pages and web objects. For example, the optimizing module 102 determines whether the terms flat-panel or high definition television appears in the same or related hyper text markup language (HTML) structure locations, such as the HTML title, or HTML block quote, on each of the subset of web pages and web objects. The alignment metric also determines whether each of the web pages and web objects in the subset has at least one search term or related term appearing consistently in the same or related structural locations.

As in the case of the search accuracy metric, the alignment metric assesses the consistent application of designated search terms or related terms across a set of web page attributes for a relevant subset of website web pages based on a specified topic/context or category. For maximum effectiveness, a set of designated search terms or related terms are specified, and a set of relevant web pages is identified based on contextual scanning after the scanning module 101 indexes all content on a subject website, including all text on each page including body content and meta-data attributes.

Given these, the alignment metric identifies and reports pages with alignment issues, i.e., where there is a failure of at least one designated keyword to appear consistently across various page attributes, including page title, URL, meta description, meta keyword, H1 tag, in-link text, document properties, and body content.

In the absence of specified search terms or related terms and corresponding identification of relevant pages, the report identifies pages with misalignments based on existing title terms. With regard to content and other structural implementation attributes that can affect proper website indexing, information retrievability, and natural or organic search productivity, three principle performance drivers are included in the analysis: a) the appropriate deployment of designated high-yield terms; b) the density of designated terms; and c) the proper alignment among designated page attributes reflected by consistent deployment of such designated terms. Search alignment assesses the degree of alignment among various page attributes by gauging the consistent presence of at least one designated search term or related term across a set of page attributes, including page title, URL, meta keyword, meta description, H1 tag, in-link text, document properties, and body content.

The integrity metric determines an amount of web pages and web objects in the subset having a unique title. The title of a web page or web object may be a header or other label associated with the web page or web object. The title of a web page or web object plays many different roles on the Internet. Because of these different roles, it enhances a web page or web object, for organic search optimization purposes, to have a unique title. One role for a title is that it is used by the major search engines as a key piece of information to determine the topic of a web page, and thus to determine the ranking of a web page in the search engine results.

The optimizing module 102 generates output data 109 including the measured values for the metrics. The measured values for the accuracy metric may include the number of web pages and web objects in the subset having at least one search term or related term. The accuracy metric may also indicate whether any of the web pages and web objects in the subset are missing a search term or related term. These web pages and web objects may be considered to be gaps.

The measured values for the alignment metric may include the number of web pages and web objects in the subset having at least one search term or related term appearing in the same or related HTML structure. The accuracy metric may also indicate whether any of the web pages and web objects in the subset are missing a search term or related term in the HTML structure. The measured values for the integrity metric may include the number of web pages and web objects in the subset having a unique title.

The output data 109 is used by the optimizing module 102 to optimize the website 110 to improve rankings in organic search results. For example, based on the output data of the identified gaps in accuracy, the web pages identified as lacking search terms or related terms are supplied with search terms or related terms. The website optimization includes identifying gaps and inserting search terms and/or related terms in the gaps. Optimizing may also include inserting search terms and/or related terms in the HTML structures based on the alignment metric. For example, a picture web object HTML structure, such as a title, is modified to include a search term or related term. Optimizing may also include modifying titles so the number of unique titles as determined for the integrity metric is above a threshold.

Optimizing may also include processing, such as for prioritization, of relevant pages to facilitate deployment of selected search-related terms in page content, meta content, etc. For example, pages may be prioritized or grouped on the basis of relative traffic volume which visits the pages as determined via web analytics or traffic reports, or based on proximity of pages to the home page or other designated landing pages, or based on directory structures, business or departmental groupings, and the like.

The search terms and related terms are deployed into the subset of web pages and web objects on the website, modifying the website to optimize it for appearing as a search result in an organic search of a topic According to one embodiment, the optimizing module 102 deploys the search terms and the related terms in a greater volume for the prioritized web pages and web objects having a higher priority. The optimizing module 102 may use metrics other than those described above for optimizing.

Following the deployment of search terms and related terms to the website, the testing module 104 of the OSO system 100 tests the website to identify any gaps in the deployment of the search terms and related terms on the website. In addition, the testing module 104 of the OSO system 100 may subsequently test the website periodically to identify any new gaps in the website relating to the topic associated with the search terms and related terms on the website.

3. Screenshots

As described above with respect to the OSO system 100, websites, such as website 110, can be modified to be optimized for achieving a higher ranking as a search result in an organic search of a topic. An optimized website may also be tested to identify any gaps in the deployment of the search terms and relevant terms on the web pages. The screenshots provided below illustrate automated reporting attributes and thresholds to help identify and prioritize gaps in website attributes, including gaps in the placement of search terms or related terms, to be addressed in order to optimize the websites for appearing as a search result in an organic search of a topic.

Figure 2A:
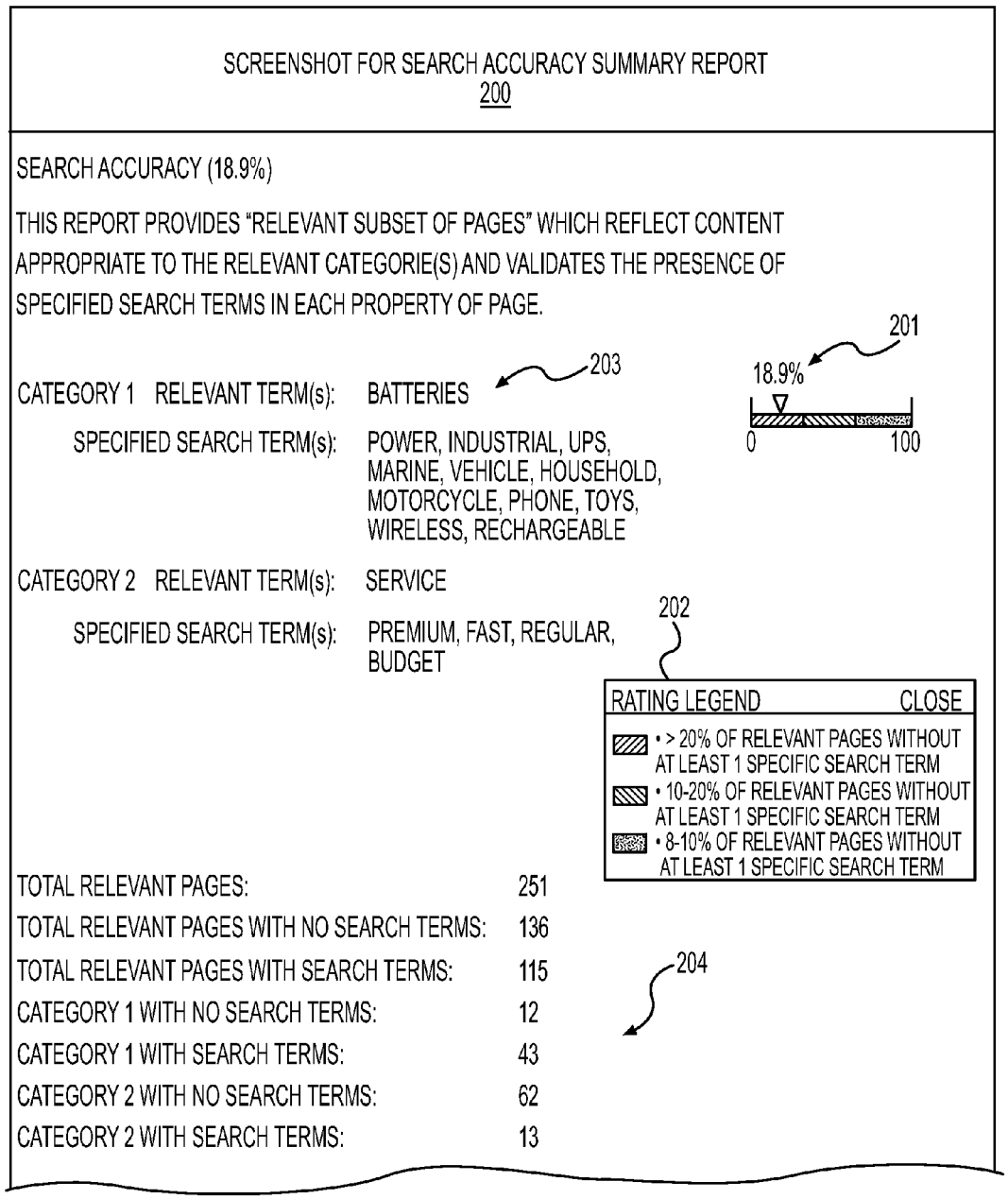

FIG. 2A illustrates a screenshot for a search accuracy summary report 200 describing the search accuracy metric. The results 201 of processing for the accuracy metric indicate that 18.9% of the relevant subset of web pages don't have a search term or related search term. A rating legend 202 may be used to quickly identify the accuracy metric. In the rating legend 202 a first color represents greater than 20% of relevant pages without at least one designated search term or related term, a second color represents 10-20% of relevant web pages without at least one designated search term or related term and a third color represents 0-10% of relevant pages without at least one designated search term or related term. The report shows the search terms and related terms at 203 and further subdivides the terms into categories for more precise detailed reporting, such as shown at 204, for the terms in each category.

FIG. 2B illustrates a screenshot for search accuracy results by category report 210. The results show which specific pages in the website include the search terms and related terms which are specified for each category and which pages do not. Section 211 of the report 210 lists 12 web pages in a web site that do not include search terms and related terms for category 1 which is related to batteries. Section 212 shows the search terms and related terms for category 1 that are identified on 4 web pages in the web site.

Figure 2C:
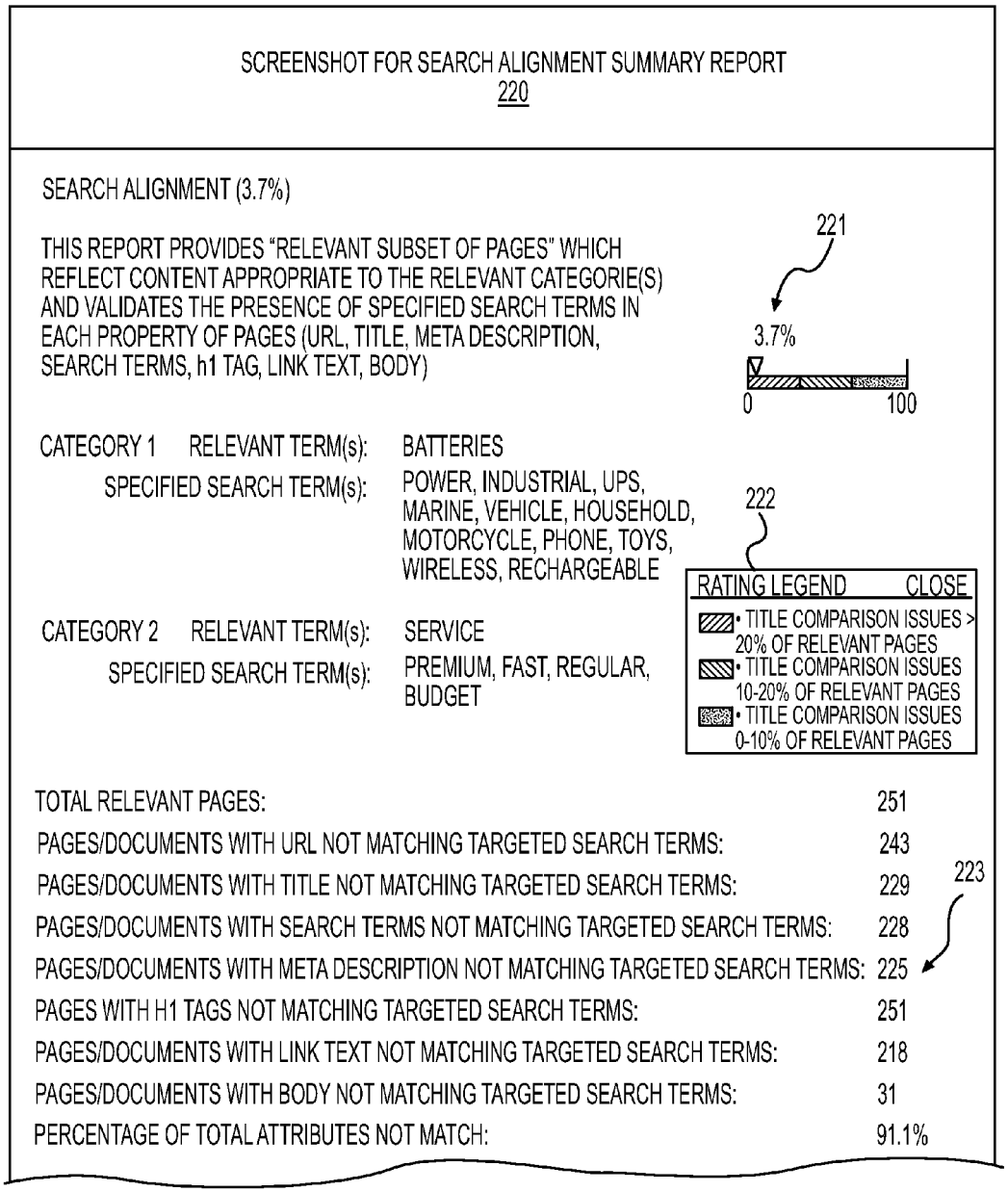

FIG. 2C illustrates a screenshot for search alignment summary report 220. The results 221 indicate that 3.7% of the relevant subset of web pages don't have an attribute (e.g., HTML web page title) including a search term or a related term. A legend 222 may be used similar to the legend in FIG. 2A. Section 223 of the report shows examples of other attributes of web pages and whether the attributes include a search term or a related term.

4. Method

Figure 3:
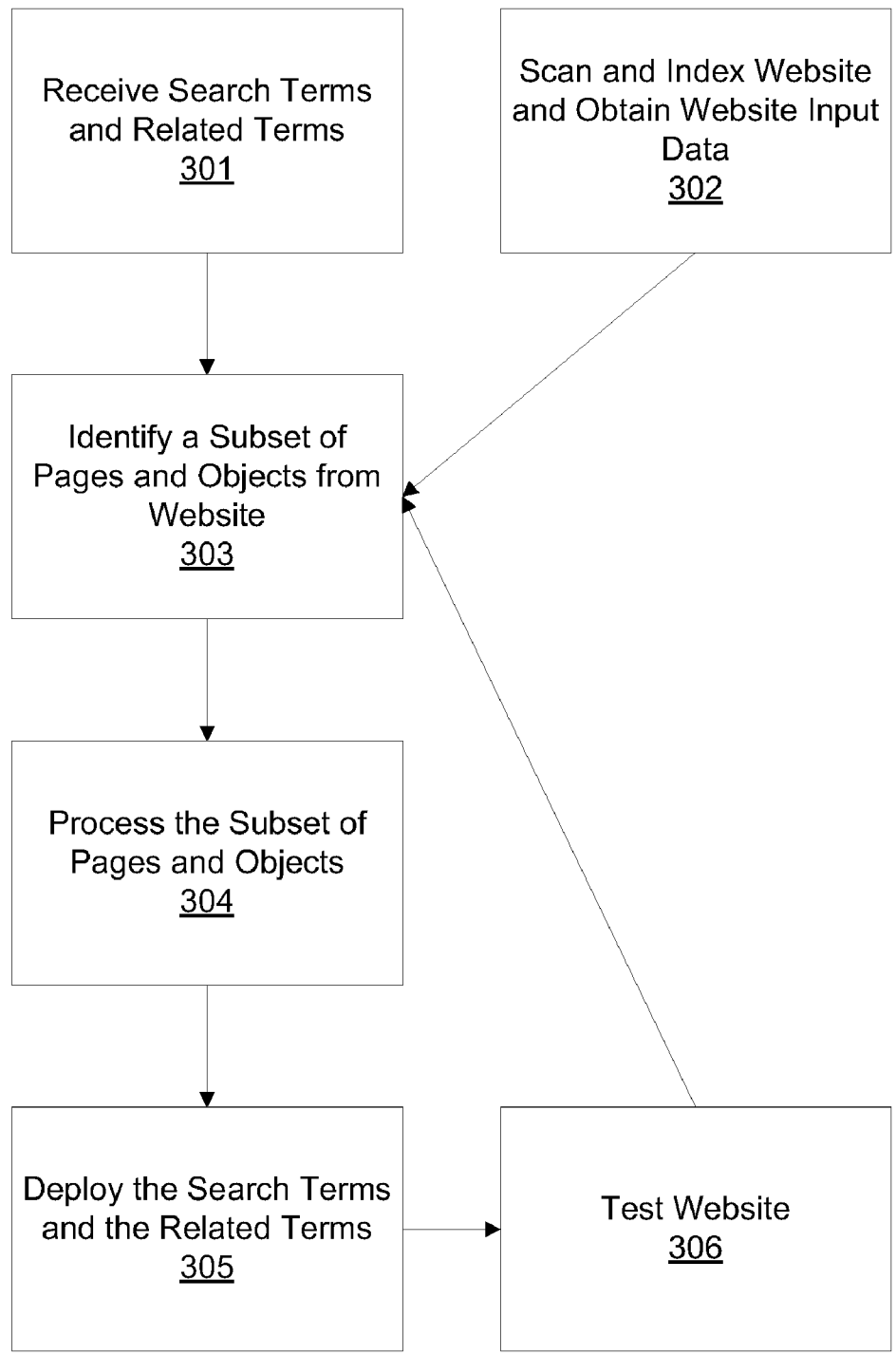
FIG. 3 illustrates a method for organic search optimization of a website using the OSO system shown in FIG. 1, according to an embodiment.

FIG. 3 illustrates a method 300, according to an embodiment, for optimizing a website for organic search. The optimizing improves the probability of the website being included in the search results for a topic and may also improve the ranking of the website in the search results. The methods herein are described with respect to the OSO system 100 shown in FIG. 1 by way of example and not limitation. This method may be performed in other systems. The steps of the methods may be performed in a different sequence or one or more may be omitted.

At steps 301, the search terms 106 and the related search terms 107 are determined for a topic. For example, a company selling flat-panel TVs online may identify flat-panel, plasma, LCD, HDTV as their selected search terms. Market analysis may be performed to determine the most relevant search terms used to identify information on flat-panel TVs. The selected search terms may be provided to the organic search optimization system from a company or an agent, such as Accenture Strategic Search Analytics.

At step 302, a website to be optimized is scanned and its web pages and web objects are indexed by the scanning module 101 in the OSO system 100. The web pages and web objects on the website may be indexed using the selected search terms and the related terms. Indexing may include indexing web objects and web pages by category or search term.

At step 303, the scanning module 101, in the OSO system 100 identifies a relevant subset of web pages and web objects from the website which are associated with the selected search terms and the related terms are identified. This is achieved, for example, through a contextual analysis or comparative analysis of indexed content versus the selected search terms and the related terms. This scanning may also identify the locations on the web pages and web objects where the selected terms may be found. For example, the scanning module 101 indexes all content on a subject website, including all text on each page including the body content and meta-data attributes. The OSO system 100 allows for input of the selected search terms and any related terms of interest that would help identify pages associated with those terms. The OSO system 100 then searches the scanned pages to identify any and all instances which contain one or more of the specified terms.

At step 304, the optimizing module 102 in the OSO system 100 processes the subset of pages and objects identified from step 303 to determine modifications to web objects, web pages and metadata for the objects and web pages. Processing by the optimizing module 102 may include measuring metrics, such as accuracy, alignment and integrity for the website and/or prioritizing the web pages and web objects based on predetermined criteria. For example, pages may be prioritized or grouped on the basis of relative traffic volume which visits the pages (as determined via web analytics or traffic reports), or based on proximity of pages to the home page or other designated landing pages, or based on directory structures, business or departmental groupings, and the like.

At step 305, the optimizing module 102 in the OSO system 100 deploys the selected search terms and the relevant terms are deployed in the subset of pages and objects based on the processing of step 304 to determine the modifications to optimize the website. For example, the processing may prioritize the subset of pages. The pages with the higher priorities may receive a greater volume of the selected search terms and the relevant terms in their content and meta data.

At step 306, the testing module 104 in the OSO system 100 tests the optimized website to identify any gaps in the deployment of the search terms and relevant terms on the web pages. The testing may repeat this process periodically and/or be included in an automated quality and compliance management process that scans for ongoing quality control and identifies the subset of web pages that correspond to a designated set of search terms and relevant terms. The process performs exception tests to identify and highlight deficiencies in term deployment in page and metadata content. Also, one or more of the steps of the method 300 may be repeated to continually or periodically optimize the website for the identified terms.

5. Computer System for Executing Software

One or more of the steps and functions described herein and one or more of the components of the systems described herein may be implemented as computer code comprising computer readable instructions stored on a computer readable storage device, such as memory or another type of storage device. The computer code is executed on a computer system, such as computer system 400 described below by a processor, such as an application-specific integrated circuit (ASIC), or other type of circuit. The code may exist as software programs comprised of program instructions in source code, object code, executable code or other formats.

Figure 4:
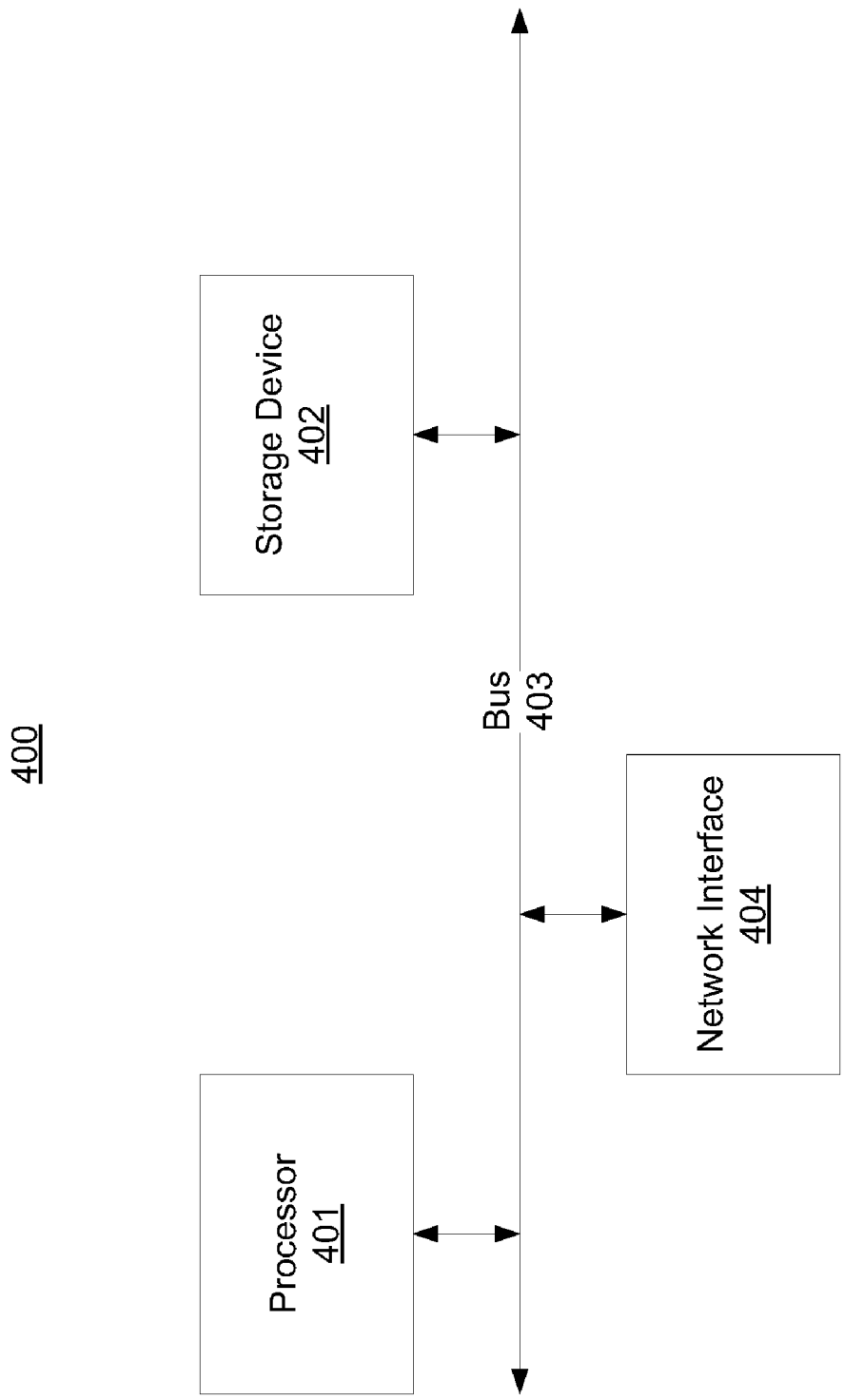
FIG. 4 illustrates a computer system configured to provide a hardware platform for the OSO system shown in FIG. 1, according to an embodiment.

FIG. 4 shows a computer system 400 that may be used as a hardware platform for the OSO system 100. Computer system 400 may be used as a platform for executing one or more of the steps, methods, and functions described herein that may be embodied as software stored on one or more computer readable storage devices, which are hardware storage devices.

The computer system 400 includes a processor 401 or processing circuitry that may implement or execute software instructions performing some or all of the methods, functions and other steps described herein. Commands and data from processor 401 are communicated over a communication bus 403. Computer system 400 also includes a computer readable storage device 402, such as random access memory (RAM), where the software and data for processor 401 may reside during runtime. Storage device 402 may also include non-volatile data storage. Computer system 400 may include a network interface 404 for connecting to a network. It is apparent to one of ordinary skill in the art that other known electronic components may be added or substituted in computer system 400.

Furthermore, the system and methods described herein are generally described with respect to modifying web pages and web objects for optimizing a website for organic search purposes. However, the system and methods are applicable to modifying other elements for other types of constructs other than websites.

While the embodiments have been described with reference to examples, those skilled in the art are able to make various modifications to the described embodiments without departing from the scope of the embodiments as described in the following claims, and their equivalents.

What is claimed is:

1. A system to modify a website to optimize the website for an organic search of a topic, the system comprising:
  a hardware processor, the hardware processor to implement:
    a data management module to
      receive search terms for the topic,
      receive related terms to the search terms for the topic, and
      receive website input data, wherein the website input data identifies web pages and web objects from the website;
    a scanning module to
      scan and index the web pages and web objects in the website, and
      identify a subset of web pages and web objects associated with the search terms and the related terms; and
    an optimizing module to
      process the subset of web pages and web objects from the website, wherein the optimizing module is to measure at least one metric with respect to the subset of web pages and web objects to determine a measured value for the at least one metric, and
      deploy the search terms and related terms into the subset of web pages and web objects on the website based on the measured value of the at least one metric,
      wherein the at least one metric includes an alignment metric, and the optimizing module is to measure the alignment metric for the website to determine whether the search terms or related terms appear consistently in the same or related locations on the web pages and web objects where the search terms or related terms are found.

2. The system of claim 1, further comprising:
a testing module to
test the subset of web pages on the website to identify gaps in the search terms and related terms on the website.

3. The system according of claim 1, wherein the at least one metric includes an accuracy metric and the optimizing module is to measure the accuracy metric for the website to verify whether at least one of the search terms or related terms is present on each web page of the subset of web pages.

4. The system of claim 1, wherein the metric includes an integrity metric and the optimizing module is to measure the integrity metric for the website to determine an amount of the subset of web pages having a unique title.

5. The system of claim 1, wherein the optimizing module is to
prioritize the subset of web pages based on at least one of proximity of the web pages to at least one of a website home page and a designated website landing page, and a website directory structure.

6. The system of claim 5, wherein the optimizing module is to
deploy the search terms and the related terms in a greater volume for the web pages having a higher priority.

7. The system of claim 1, wherein the scanning module is to
identify the subset of web pages and web objects from the website by comparing the indexed web pages and web objects with the search terms and the related terms.

8. A method for modifying a website to optimize the website for an organic search of a topic, the method comprising:
receiving search terms for the topic,
receiving related terms to the search terms for the topic, and
receiving website input data, wherein the website input data includes web pages and web objects from the website;
scanning and indexing the web pages and web objects in the website, and
identifying a subset of web pages and web objects associated with the search terms and the related terms;
processing, by a computer system, the subset of web pages and web objects from the website by measuring at least one metric with respect to the subset of web pages and web objects, and
deploying the search terms and related terms into the subset of web pages and web objects on the website based on the processing;
wherein measuring the at least one metric includes measuring an alignment metric for the website and the processing further comprises measuring the alignment metric by determining whether the search terms or related terms appear consistently in the same or related locations on the web pages and web objects where the search terms or related terms are found.

9. The method of claim 8, the method further comprising:
testing the subset of web pages on the website to identify gaps in the search terms and related terms on the website.

10. The method according to claim 8, wherein measuring the at least one metric includes
measuring an accuracy metric for the website to determine whether at least one of the search terms or related terms is present on each web page of the subset of web pages.

11. The method of claim 8, wherein measuring the at least one metric includes measuring an integrity metric for the website to determine an amount of the subset of web pages having a unique title.

12. The method of claim 8, wherein the processing comprises:
prioritizing the subset of web pages based on at least one of proximity of the web pages to a website home page or other designated website landing page, and a website directory structure.

13. The method of claim 12, wherein the deploying comprises:
deploying the search terms and the related terms in a greater volume for the web pages having a higher priority.

14. The method of claim 8, wherein the identifying comprises:
identifying the subset of web pages and web objects from the website by comparing the indexed web pages and web objects with the search terms and the related terms.

15. A non-transitory computer readable medium storing computer code that when executed by a computer system cause the computer system to:
receive search terms for the topic;
receive related terms to the search terms for the topic;
receive website input data, wherein the website input data includes web pages and web objects from the website;
scan and indexing the web pages and web objects in the website;
identify a subset of web pages and web objects associated with the search terms and the related terms;
process the subset of web pages and web objects from the website by measuring at least one metric with respect to the subset of web pages and web objects; and
deploy the search terms and related terms into the subset of web pages and web objects on the website based on the processing;
wherein the at least one metric includes an alignment metric for the website to determine whether the search terms or related terms appear consistently in the same or related locations on the web pages and web objects where the search terms or related terms are found.

16. The non-transitory computer readable medium according to claim 15, wherein the metric includes an accuracy metric and the computer code is to:
measure the accuracy metric for the website by verifying at least one of the search terms or related terms is present on each web page of the subset of web pages; and
generating a report including the measured accuracy metric.

17. The non-transitory computer readable medium according to claim 15, wherein the computer code is to:
measure an integrity metric for the website, wherein measuring the integrity metric for the website includes determining an amount of the subset of web pages having a unique title.

* * * * *